United States Patent [19]

Miyamoto

[11] 4,437,673
[45] Mar. 20, 1984

[54] SEALING DEVICE

[75] Inventor: Yoshiaki Miyamoto, Fukushima, Japan

[73] Assignee: Nippon Oil Seal Industry Co., Ltd., Tokyo, Japan

[21] Appl. No.: 310,404

[22] Filed: Oct. 9, 1981

[30] Foreign Application Priority Data

Oct. 21, 1980 [JP] Japan .............................. 55-150340[U]

[51] Int. Cl.$^3$ .......................... F16J 15/16; F16J 15/34
[52] U.S. Cl. ......................................... 277/65; 277/38; 277/39
[58] Field of Search ....................... 277/38, 65, 39, 47, 277/67, 68, 69, 81 R, 25, 92, 95, 181, 183, 235 R

[56] References Cited

U.S. PATENT DOCUMENTS 2,446,243  3/1948  Reynolds ............................ 277/95
3,275,333  9/1963  Scott et al. ........................... 277/39

FOREIGN PATENT DOCUMENTS 637097  5/1935  Fed. Rep. of Germany ........ 277/38

Primary Examiner—Stuart S. Levy
Assistant Examiner—Lloyd D. Doigan
Attorney, Agent, or Firm—Holman & Stern

[57] ABSTRACT

A sealing device comprising a first seal member mounted on a rotating shaft extending through a housing and having a body portion and a radial component formed integral with and extending radially outwardly from the body portion, the body portion forming an annular groove, and a second seal member mounted on the housing to seal a gap between the housing and the rotating shaft by cooperating with the first seal member, the second seal member having a reinforcement made of a metal plate and a seal lip made of resilient rubber provided on the inner end of the reinforcement member and in sliding contact with the radial component of the first seal member.

7 Claims, 3 Drawing Figures

4,437,673

SEALING DEVICE

BACKGROUND OF THE INVENTION

1. Field of the Invention

The present invention relates to a sealing device and more particularly to a sealing device suitable for use in such locations as an engine crank shaft where it is required to prevent sand and dust from getting in through a gap between the rotating shaft and a housing and to prevent leakage of lubricating oil out through the gap.

2. Description of the Prior Art

A sealing device the construction of which is shown in FIG. 1 is known.

Referring to FIG. 1, a rotary shaft 33 is extended through a housing 31. A rotary member 30 is fixedly mounted on the rotary shaft 33. A seal ring 34 is fixed to the housing 31 via a fixed member 40. A seal lip portion 35 of the seal ring 34 contacts with a side surface 32 of an end portion of the rotary member 30, to allow a space A containing a fluid to be sealed including an oil, to be shut off from the atmospheric air B. The fixed member 40 and a hook-shaped portion 36 of the rotary member 30 form a narrow gap 37 therebetween. The fixed member 40 is provided in the surface thereof which is close to the seal ring with a groove 41 which is sunk inwardly with respect to the radius of the rotary shaft 33. In order to increase the sealability of the fixed member 40 and housing 31 with respect to each other, an O-ring 43 is provided in an annular groove 42 formed in a housing-contacting surface of the fixed member 40.

The sealing device of the above-described conventional construction has the following disadvantages.

(1) Since the fixed member 40 provided with the groove 41 is not rotated, the oil leaking out into the groove 41 from the sealed fluid-containing space A is not influenced by the centrifugal force while the oil stays in the groove 41, so that the leaked oil is not returned to the sealed fluid-containing space A at a high efficiency.

(2) This sealing device requires the fixed member 40 for supporting the seal ring 34 on the housing 31, and also the O-ring 43 for keeping the housing 31 and fixed member 40 sealed with respect to each other. This causes the construction of the sealing device to be complicated, and the manufacturing cost thereof to be increased.

SUMMARY OF THE INVENTION

An object of the present invention is to provide a sealing device which is light in weight, simple in construction and easy to assemble.

Another object of the present invention is to provide a sealing device capable of maintaining a high sealing performance by forcing the leaked oil back to the oil side.

DETAILED DESCRIPTION OF PREFERRED EMBODIMENTS

Figure 2:
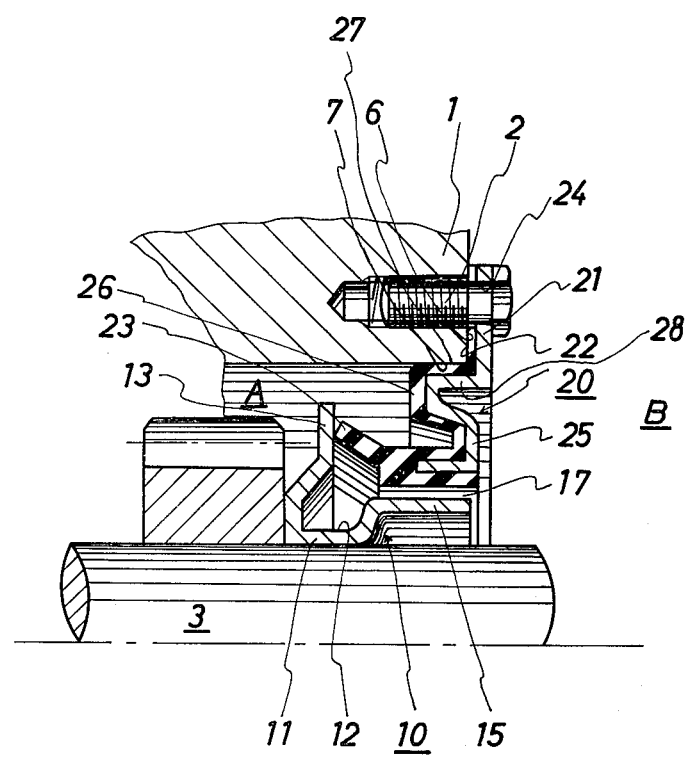
FIG. 2 is a cross-sectional view showing one embodiment of the present invention.

In FIG. 2, extending through a housing 1 is a rotating shaft 3 on the circumferential surface of which are mounted a bearing member (not shown) and a first sealing means 10 formed by a press from a metal plate. A second sealing means 20 is fixed to the housing 1. The first sealing means 10 comprises a body portion 11 forming an annular groove 12, a radial component 13 extending radially outwardly from the body portion 11 on the sealed fluid side A (to the left of the drawing), and a cylindrical axial component 15 extending axially from the body portion 11 with a certain gap between it and the circumferential surface of the rotating shaft 3. The second sealing means 20 cooperating with the first sealing means 10 to seal the gap between the housing 1 and the rotating shaft 3 has a metal reinforcement member 25. The reinforcement member 25 has at one end a radially extended retainer portion 21 with a bolt hole 24 to fasten the second sealing means 20 to the housing 1 by the bolt 2. At the other end, it also has a seal lip portion 23, extending outwardly and aslant, of resilient rubber securely bonded thereto which engages with and slides on the radial component 13 of the first sealing means 10. To the side of the reinforcement member 25 facing the housing is attached a lining 26 of resilient rubber integral with the seal lip 23. The rubber lining 26 forms a gasket portion 22 at the retainer portion 21. At a point radially inside of the retainer portion 21 the second sealing means 20 is bent into an "L" shape in cross section which is pressed against the end surface 6 and the inner circumferential surface 7 of the housing 1 thereby ensuring the correct positioning of the second sealing member 20 and the complete sealing between it and the housing 1. This radially extended retainer portion 21 is especially effective to ensure the obtaining of the contact load of the seal lip 23 to the radial component 13 at the assembly. A narrow gap 17 is formed between the axial component 15 of the first sealing means 10 and the inner circumferential surface of the second sealing means 20 at the radially inner end of the reinforcement member 25.

Figure 3:
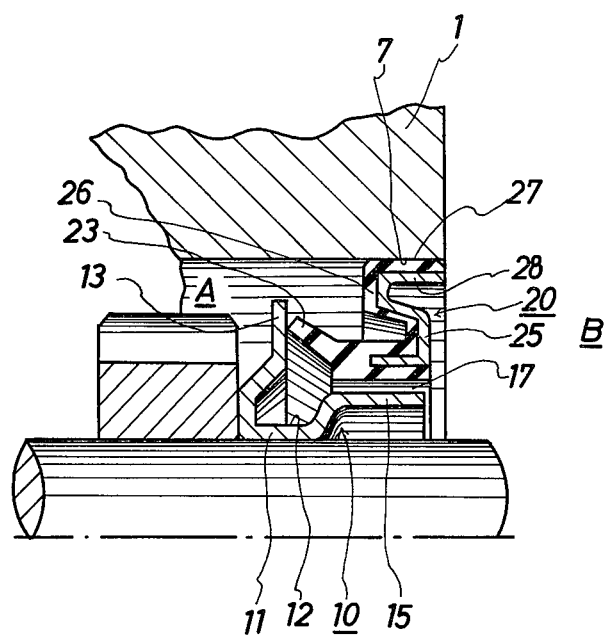
FIG. 3 is a cross-sectional view showing another embodiment of the present invention.

In another embodiment shown in FIG. 3, the outer portion of the second sealing means 20 is slightly different from the embodiment shown in FIG. 2. That is, in this embodiment, the second sealing means 20 does not have the radially extended retainer portion 21 in FIG. 2, and an outer cylindrical surface 27 is press-fitted to the housing 1 to fix the second sealing means 20 to the housing 1 without the bolt. Other structural features of this embodiment are identical to the embodiment of FIG. 2.

Because of the construction described above, the present invention provides the following effects and advantages.

Figure 1:
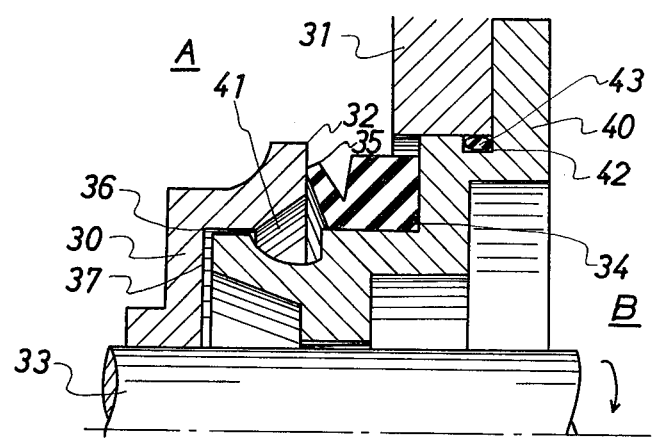
FIG. 1 is a cross-sectional view showing a sealing device of the prior art.

The first sealing means 10 can be formed from a single sheet of metal plate by a press. The resilient seal lip 23 is formed by vulcanizing the resilient rubber to secure it to the reinforcement member 25 formed by a press from a sheet of metal plate. Furthermore, the axial component 15 is provided on the first sealing means 10 to form a narrow gap between the second sealing means 20 and the axial component 15 of the first sealing means 10 thus forming a labyrinth seal. In this way the sealing device of this invention has a very simple construction yet provides a good sealing capability. As the reinforcement member 25 is made of the metal sheet, when the inner circumferential surface 7 of the housing 1 is rather smooth, a rubber gasket portion bonded on an outer cylindrical portion 28 of the reinforcement member 25 is not necessary and the seal between the housing 1 and the second sealing means 20 can be obtained by the press-fit of the ground and finished outer surface of the outer cylindrical portion 28 to the housing 1, and in this case, the fastening by the bolt 2 in FIG. 2 is not necessary. However, it is preferable to provide this rubber gasket portion as shown in FIGS. 2 and 3 for insuring the seal. In any case, other sealing parts such as an O-ring 43 in FIG. 1 need not be provided between the housing 1 and the second sealing means 20.

If lubricating oil in the sealed fluid side A should leak out into the open air side B between the radial component 13 and the seal lip 23, the leaked oil will be trapped in the annular groove 12. Since the first sealing means 10 is turning together with the rotating shaft 3, the oil trapped in the annular groove 12 will be forced radially outwardly along the radial component 13 by the centrifugal force to be pushed back toward the sealed fluid side A.

In addition, when the axial component 15 is provided on the first sealing means 10 to form the narrow gap 17 between the second sealing means 20 and the axial component 15, sand and other foreign matter in the open air side B can be effectively blocked from getting into the sliding surface of the seal lip 23. This maintains the good sealing performance of the seal lip 23 over a long period of time.

What is claimed is:

1. A sealing device for sealing the gap between two relatively rotatable machine members such as a rotating shaft extending through a housing with a gap therebetween comprising: a first seal member mounted on the rotating shaft to be rotated thereby having a substantially axially extending body portion and a radial component formed integral with and extending radially outwardly from said body portion, said body portion forming an annular groove on the radially outer surface thereof; a second seal member mounted on said housing in cooperating sealing relationship with said first seal member comprising, a reinforcement member made of metal plate extending substantially radially in said gap, a seal lip made of resilient rubber provided at the radially inner end of said reinforcement member and extending radially outwardly at an angle with respect to the shaft and in sliding contact with said radial component of said first member, and an axially extending radially inner circumferential surface on said radially inner end of said reinforcement member; and a cylindrical axial component extending axially from said body portion of said first sealing member and offset radially outwardly therefrom to form a narrow annular space between the radially outer circumferential surface of said cylindrical axial component and said inner circumferential surface of said reinforcement member.

2. A sealing device as set forth in claim 1, wherein said second seal member further comprises an outer cylindrical portion on said reinforcement member and a rubber gasket portion bonded on said outer cylindrical portion to provide a gasket between said second seal member and said housing.

3. A sealing device as claimed in claim 1 wherein said annular groove is positioned substantially radially inwardly of said radial component on said first seal member so that when said body portion is rotating, oil collected in said groove will be thrown radially outwardly between said seal lip and said radial component on said first seal member.

4. A sealing device for sealing the gap between two relatively rotatable machine members such as a rotating shaft extending through a housing with a gap therebetween comprising; a first seal member mounted on the rotating shaft to be rotated thereby having a substantially axially extending body portion and a radial component formed integral with and extending radially outwardly from said body portion, said body portion forming an annular groove on the radially outer surface thereof; and a second seal member mounted on said housing in cooperating sealing relationship with said first seal member comprising, a reinforcement member made of metal plate extending substantially radially in said gap, a seal lip made of resilient rubber provided at the radially inner end of said reinforcement member and extending radially outwardly at an angle with respect to the shaft and in sliding contact with said radial component of said first member, a radially extended retainer portion which is pressed against an end surface of said housing, and means to attach said retainer portion to said end surface.

5. A sealing device as set forth in claim 4, wherein said radially extended retainer portion is an integral part of said reinforcement member and said sealing member further comprises a gasket portion bonded on said retainer portion to provide a gasket between said retainer portion and said end surface of said housing.

6. A sealing device as set forth in claim 5, wherein said gasket portion is integral with said seal lip.

7. A sealing device as claimed in claim 6 and further comprising an outer cylindrical portion on said reinforcement member extending axially from the radially inner end of said retainer member into said gap and an axially extending rubber gasket portion bonded on said outer cylindrical portion of said reinforcement member to provide a gasket between said outer cylindrical portion and said housing, said axial gasket being integral with and between said seal lip and said radial gasket.

* * * * *